United States Patent
Takahashi et al.

(10) Patent No.: US 7,978,229 B2
(45) Date of Patent: Jul. 12, 2011

(54) IMAGE PICKUP APPARATUS AND METHOD FOR CONTROLLING THE SAME

(75) Inventors: Koji Takahashi, Chigasaki (JP); Hisataka Hirose, Yokohama (JP); Hiroyuki Shimizu, Yokohama (JP); Kenichi Kondo, Tokyo (JP); Kenji Kyuma, Yokohama (JP); Masami Sugimori, Yamato (JP)

(73) Assignee: Canon Kabushiki Kaihsa, Tokyo (JP)

( * ) Notice: Subject to any disclaimer, the term of this patent is extended or adjusted under 35 U.S.C. 154(b) by 645 days.

(21) Appl. No.: 12/125,659

(22) Filed: May 22, 2008

(65) Prior Publication Data
US 2008/0297613 A1    Dec. 4, 2008

(30) Foreign Application Priority Data
May 31, 2007    (JP) .................. 2007-146104

(51) Int. Cl.
*H04N 5/228*    (2006.01)

(52) U.S. Cl. .................... 348/222.1
(58) Field of Classification Search .......... None
See application file for complete search history.

(56) References Cited

U.S. PATENT DOCUMENTS 5,196,938 A * 3/1993 Blessinger ............ 348/22
5,739,865 A * 4/1998 Takahashi ............. 375/240.03
7,430,015 B2 * 9/2008 Ohki ..................... 348/459

* cited by examiner

*Primary Examiner* — Justin P Misleh
(74) *Attorney, Agent, or Firm* — Canon U.S.A. Inc., IP Division

(57) ABSTRACT

An image pickup apparatus including a photoelectric conversion element, first, a shutter speed for still-image pickup is set. Next, an image-pickup frame rate is set on the basis of the shutter speed for still-image pickup. Then, an operation of the photoelectric conversion element is controlled such that picked-up images are output at the set image-pickup frame rate. When the image-pickup frame rate that is set is higher than a moving-image-reproducing frame rate, a frame for use in a moving-image reproduction is generated from a plurality of frames of the picked-up images and reproduction is performed at the moving-image-reproduction frame rate.

9 Claims, 14 Drawing Sheets

IMAGE PICKUP APPARATUS AND METHOD FOR CONTROLLING THE SAME

BACKGROUND OF THE INVENTION

1. Field of the Invention

The present invention relates to image pickup apparatuses and methods for controlling the same. In particular, the present invention relates to an image pickup apparatus capable of picking up moving images and still images and a method for controlling the image pickup apparatus.

2. Description of the Related Art

Many of image pickup apparatuses using a photoelectric conversion element (such as a charge-coupled device (CCD) image sensor or a complementary metal-oxide semiconductor (CMOS) image sensor) as an image pickup element are capable of selectively picking up still and moving images and performing an image pickup operation according to the user's preference.

Such image pickup apparatuses typically require the user to pre-select either a mode (still image mode) for picking up still images or a mode (moving image mode) for picking up moving images.

There are some image pickup apparatuses in which, when a button for picking up still images is pressed during a moving-image pickup operation, the image pickup mode switches from a moving image mode to a still image mode which enables a still-image pickup operation. However, since a moving image picked up during switching from the moving image mode to the still image mode is lacked and discontinuously recorded, the resulting moving image does not look natural when reproduced.

There is proposed an image pickup apparatus which allows quick switching to a still image mode so as to minimize lacking of a moving image during switching to the still image mode. However, when the switching is done quickly, the timing to release a shutter for still-image pickup may be off. In this case, a recovery process is performed to generate a still image from a picked-up moving image. However, since the number of pixels constituting a moving image is smaller than the number of pixels constituting a still image, the quality of the still image generated from the moving image is not satisfactory.

Additionally, in this case, the operation of an aperture mechanism for controlling an incident light quantity is not quick enough to respond to the quick mode switching. Practically, this means that it is not possible to change the shutter speed, and thus, exposure time for a still-image pickup operation is made the same as that for a moving-image pickup operation. As a result, when an image of a moving subject is picked up, the resulting image may suffer from blurring.

SUMMARY OF THE INVENTION

An embodiment of the present invention provides an image pickup apparatus overcoming or mitigating the above-described problems of the related art and capable of picking up high-quality moving and still images, and also provides a method for controlling the image pickup apparatus.

According to a first aspect of the present invention, an image pickup apparatus that outputs picked-up images on a frame-by-frame basis from an image pickup element having a plurality of pixels includes a shutter-speed setting unit configured to set a shutter speed for still-image pickup, a frame-rate setting unit configured to set an image-pickup frame rate based on the shutter speed set by the shutter-speed setting unit, a control unit configured to control an operation of the image pickup element such that the picked-up images are output at the image-pickup frame rate, and a moving-image reproducing unit configured to perform moving-image reproduction by using the picked-up images. When the image-pickup frame rate set by the frame-rate setting unit is higher than a moving-image-reproduction frame rate, the moving-image reproducing unit generates a frame for use in the moving-image reproduction from a plurality of frames of the picked-up images and performs reproduction at the moving-image-reproduction frame rate.

Further features of the present invention will become apparent from the following description of exemplary embodiments with reference to the attached drawings.

DESCRIPTION OF THE EMBODIMENTS

Hereinafter, the present invention will be described in detail on the basis of exemplary embodiments illustrated in the attached drawings.

First Exemplary Embodiment

Figure 1:
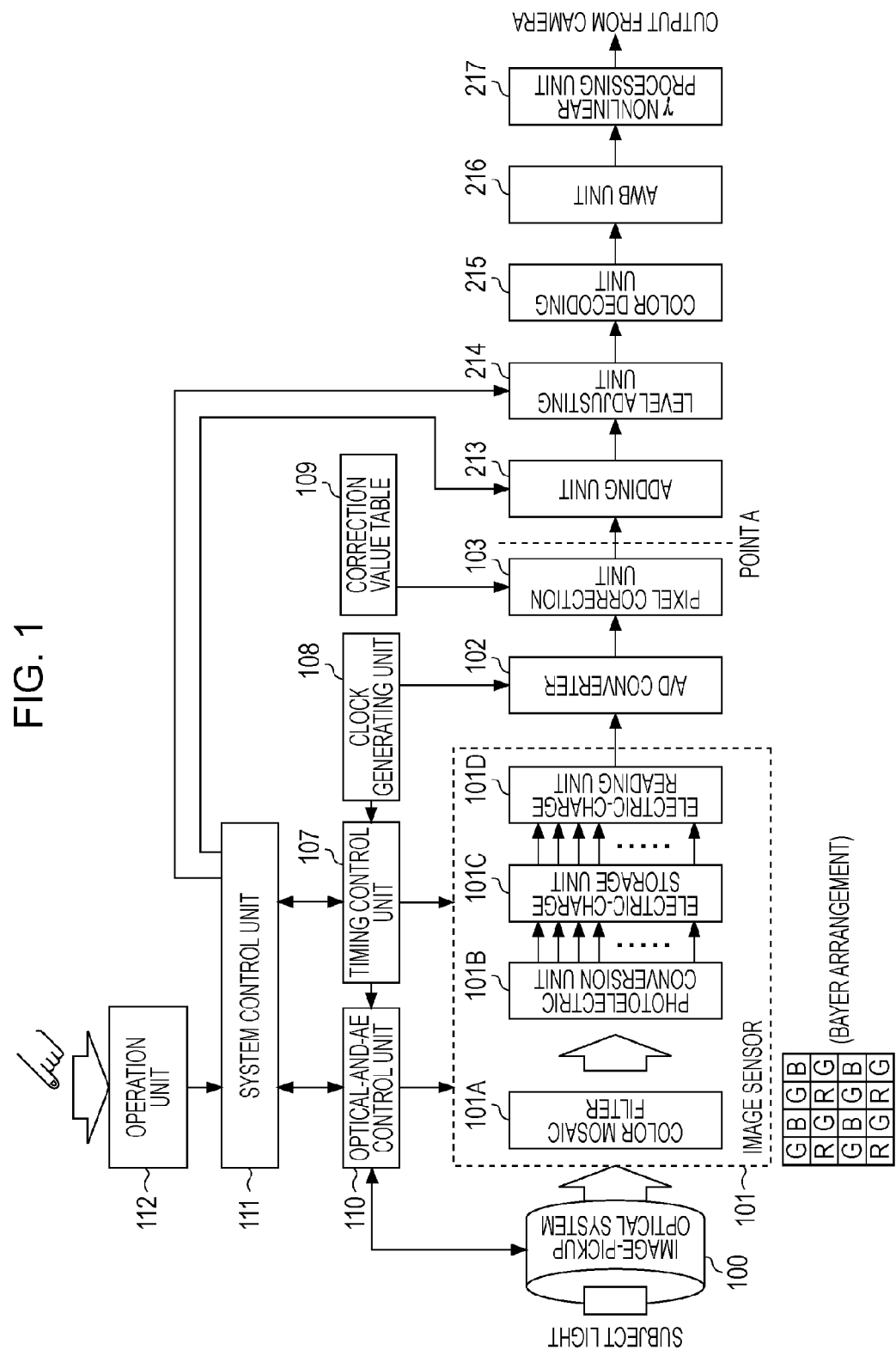
FIG. 1 illustrates a configuration of a digital video camera serving as an example of an image pickup apparatus according to a first exemplary embodiment of the present invention.

FIG. 1 illustrates a configuration of a digital video camera serving as an example of an image pickup apparatus according to a first exemplary embodiment of the present invention.

A system control unit 111 includes a central processing unit (CPU) and a read-only memory (ROM) (both of which are not shown) for storing a control program executed by the CPU. The system control unit 111 controls the entire process of the digital video camera.

An operation unit 112 includes input devices, such as keys and buttons, for enabling a user to enter instructions to the digital video camera; and a display device, such as a liquid crystal display (LCD), for displaying menus, various kinds of information, and the like.

The system control unit 111 detects an operation (e.g., user input operation) of the operation unit 112, and thus, an appropriate operation corresponding to the detected operation is performed.

An image-pickup optical system 100 causes light (subject light) from an image pickup subject to form an image onto an image sensor 101, which is a photoelectric conversion element. The image-pickup optical system 100 includes optical systems for focus and zoom adjustment, and also includes optical systems (such as an aperture and a neutral density (ND) filter) for adjusting a light quantity. The image-pickup optical system 100 may further include a shift optical system, a variable vertex angle prism, or the like for correcting image blur caused by hand shake. An optical-and-automatic-exposure (AE) control unit 110 controls the image-pickup optical system 100 on the basis of information from the system control unit 111.

The image sensor 101 or the photoelectric conversion element includes a color mosaic filter 101A which allows only a specific color component to pass through on a pixel-by-pixel basis. The light passing through the color mosaic filter 101A is photoelectrically converted into electric charge by a photoelectric conversion unit 101B on a pixel-by-pixel basis. The electric charge is output from the photoelectric conversion unit 101B, transferred to an electric-charge storage unit 101C, and temporarily stored therein. An electric-charge reading unit 101D reads the electric charge stored in the electric-charge storage unit 101C as an analog signal at predetermined time points. The read analog signal is converted by an analog-to-digital (A/D) converter 102 into a digital signal. This A/D conversion is performed in response to a clock signal from a clock generating unit 108.

The clock generating unit 108 supplies a clock signal also to a timing control unit 107 which controls the image sensor 101. In response to the received clock signal, the timing control unit 107 generates a timing signal to control an operation of the image sensor 101.

On the basis of information from a correction value table 109, a pixel correction unit 103 performs image processing on a pixel signal output from the A/D converter 102 so as to correct noise and defects in each pixel. Correction values in the correction value table 109 are recorded, for example, during adjustment for shipment from the factory.

Typical image processing performed by the pixel correction unit 103 includes processing in which less reliable pixel values are interpolated from neighboring pixel values, and also includes subtraction of predetermined noise values. Image data output from the pixel correction unit 103 is referred to as RAW data. In FIG. 1, an output from "point A" corresponds to RAW data.

Under the control of the system control unit 111, an adding unit 213 performs a frame adding process on RAW data output by the pixel correction unit 103 to add a plurality of frames together. A level adjusting unit 214 divides, by the number of frames added together, the result of the addition performed by the adding unit 213 so as to average pixel values. Such an averaging process is not performed when no adding process is performed.

A color decoding unit 215 performs color interpolation for each pixel to generate an RGB signal. Then, an automatic white balance adjustment (AWB) unit 216 adjusts color balance. A nonlinear processing unit 217 performs nonlinear processing (commonly referred to as gamma correction) in a level direction to improve gradation expression. As necessary, the form of the signal output from the nonlinear processing unit 217 may be converted to a known signal form, such as a Y—Cr—Cb form. Then, picked-up image data is output.

(Operation Overview)

Figure 3:
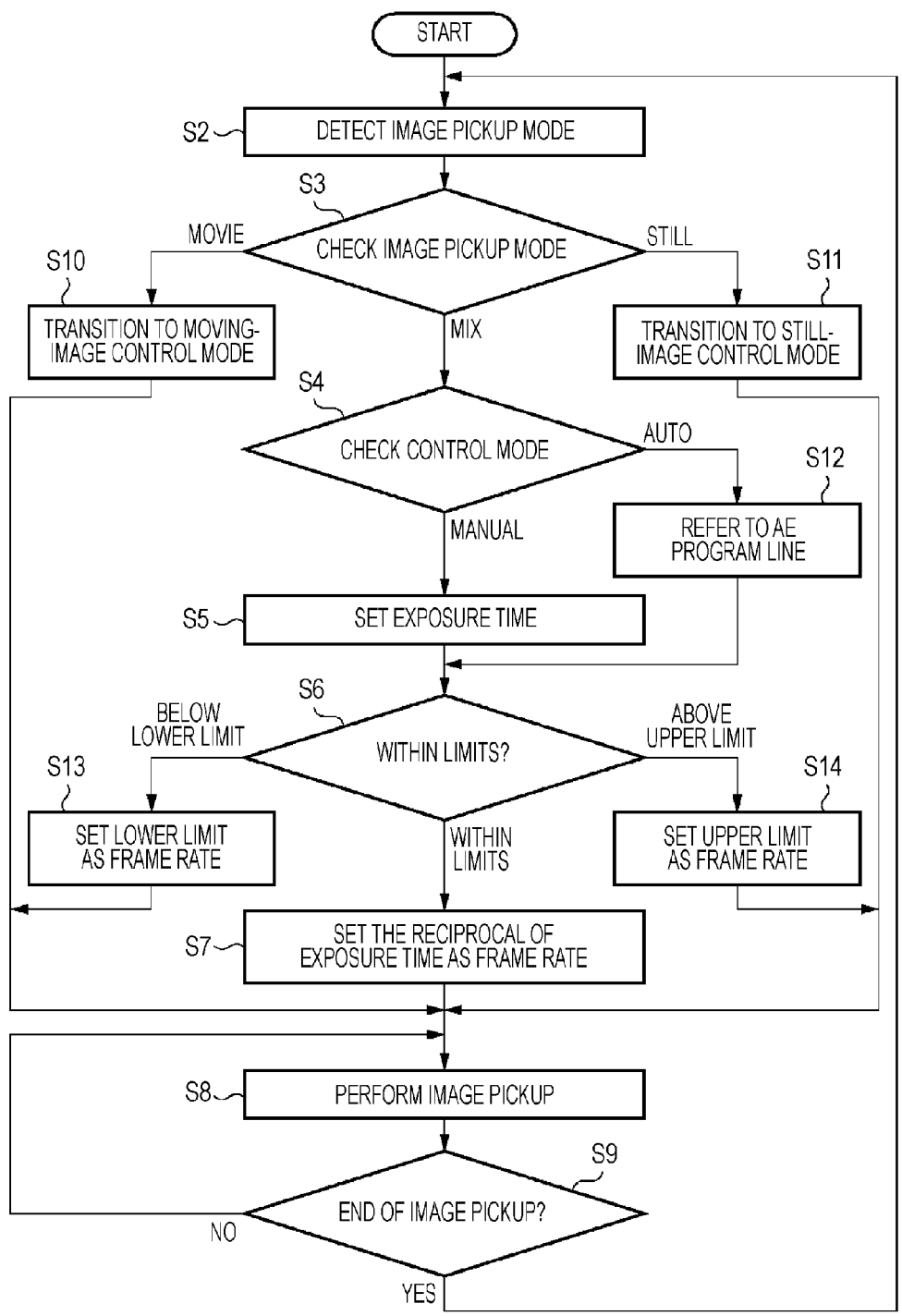
FIG. 3 is a flowchart illustrating an overview of an operation of the digital video camera according to the first exemplary embodiment of the present invention.

Next, with reference to the flowchart of FIG. 3, an overview of an operation of the digital video camera of the present exemplary embodiment will be described.

In step S2, the system control unit 111 detects an image pickup mode selected by the user through the operation unit 112. The digital video camera of the present exemplary embodiment provides three selectable image pickup modes, a still image mode (Still), a moving image mode (Movie), and a mix mode (Mix) for picking up both moving and still images.

In step S3, according to the image pickup mode detected in step S2, the system control unit 111 causes the process to proceed to one of three subsequent steps. Specifically, if the moving image mode is detected in step S2, the process proceeds from step S3 to step S10 where a moving-image control mode is entered; while if the still image mode is detected in step S2, the process proceeds from step S3 to step S11 where a still-image control mode is entered. From either of step S10 and step S11, the process proceeds to step S8, where a moving-image pickup process or a still-image pickup process is performed in a manner similar to that of the related art.

On the other hand, if the mix mode is detected in step S2, the process proceeds from step S3 to step S4, where the system control unit 111 determines whether the control mode selected by the user is an automatic mode (Auto) or a manual mode (Manual).

If it is determined in step S4 that the control mode is the manual mode, the system control unit 111 sets the exposure time to a value specified by the user (step S5) Alternatively, at this point, the operation unit 112 may display a menu screen or the like to prompt the user to specify the exposure time.

On the other hand, if it is determined in step S4 that the control mode is the automatic mode, the system control unit 111 sets optimum exposure time on the basis of a program line for AE control (step S12).

Thus, the exposure time for still-image pickup is set either by the AE control or the user's selection.

In step S6, the system control unit 111 checks the relationship between the set exposure time and the range of predetermined exposure time. In the digital video camera of the present exemplary embodiment, an image-pickup frame rate (the number of image frames picked up per unit time) is set according to set exposure time (shutter speed). Since there are some limits for the frame rate, the system control unit 111 checks the limits in advance.

For still-image pickup, a typical shutter speed may be set to a value ranging from a fraction of a second to several thousandths of a second. For moving-image pickup, a frame rate ranges from 24 frames per second (fps) to 1000 fps.

In the present exemplary embodiment, a frame rate for moving-image pickup is set according to a shutter speed (exposure time) set for still-image pickup. Specifically, a settable range of frame rates for moving-image pickup is defined, and if the reciprocal of exposure time for still-image pickup is within the settable range of frame rates, the reciprocal of exposure time for still-image pickup is set as the frame rate for moving-image pickup. On the other hand, if the reciprocal of exposure time for still-image pickup is outside the settable range of frame rates, the upper limit or the lower limit of the settable range is set as the frame rate for moving-image pickup.

For example, if the settable range of frame rates for moving-image pickup is from 24 fps to 1000 fps and the set exposure time for still-image pickup is $\frac{1}{8}$ second, the reciprocal, 8 fps, is below the lower limit of the settable range. Therefore, the system control unit 111 sets the lower limit 24 fps as the frame rate (step S13).

In this example, if the set exposure time for still-image pickup is $\frac{1}{8000}$ second, the reciprocal, 8000 fps, exceeds the upper limit of the settable range. Therefore, the system control unit 111 sets the upper limit 1000 fps as the frame rate (step S14).

If the set exposure time for still-image pickup is in the range from $\frac{1}{24}$ second to $\frac{1}{1000}$ second, the corresponding reciprocal in the range from 24 fps to 1000 fps is within the settable range of frame rates. Therefore, the system control unit 111 sets the reciprocal of the set exposure time as the frame rate (step S7). That is, if the set exposure time for still-image pickup is $\frac{1}{500}$ second, the system control unit 111 sets the frame rate for moving-image pickup to 500 fps. In the present exemplary embodiment, resolution for image pickup in the mix mode is at a level (several millions of pixels or more) which allows each frame to be viewed satisfactorily as a still image. For example, in an embodiment, resolution for image pickup in the mix mode is substantially the same as that in the still image mode.

In step S8, the system control unit 111 performs an image pickup operation in the selected mode in response to a start instruction entered by the user through the operation unit 112.

In step S9, the system control unit 111 determines whether a stop instruction for ending the image pickup operation has been entered by the user through the operation unit 112. If no stop instruction has been entered, the system control unit 111 continues to perform the image pickup operation in step S8. If the system control unit 111 detects in step S9 that the stop instruction has been entered, the system control unit 111 ends the image pickup operation and returns the process to step S2.

(Frame Adding Process)

Next, the operation of the adding unit 213 and level adjusting unit 214 will be further described.

The adding unit 213 and the level adjusting unit 214 are provided to adjust the frame rate of RAW data picked up in the mix mode to a frame rate suitable for moving image reproduction.

In the mix mode, as described above, the image pickup is performed at a frame rate determined according to the exposure time for still-image pickup. In the example described above, if the exposure time (shutter speed) set for still-image pickup is $\frac{1}{240}$ second, the image pickup is performed at a frame rate of 240 fps. Therefore, the pixel correction unit 103 outputs 240 frames of RAW data per second.

A typical moving-image-reproduction frame rate for reproduction of moving images is 30 fps. Therefore, if no adjustment is made, a moving image is reproduced at a frame rate that is $\frac{1}{8}$ the frame rate of 240 fps. Since this is inconvenient, the system control unit 111 causes the adding unit 213 and the level adjusting unit 214 to allow a moving image to be output at 30 fps.

That is, in this example, to output a moving image at 30 fps from the result of the image pickup operation at 240 fps, the system control unit 111 causes the adding unit 213 to add 8 consecutive frames of RAW data together. Then, the system control unit 111 causes the level adjusting unit 214 to divide the result of the addition by 8, which is the number of frames added together, to average the pixel values. Thus, the level adjusting unit 214 outputs a moving image at a frame rate of 30 fps.

When the image-pickup frame rate is not a multiple of the moving-image-reproduction frame rate, the system control unit 111 controls the adding unit 213 such that, for example, frames to be added together by the adding unit 213 partially overlap. Thus, a moving image can be output at the moving-image-reproduction frame rate.

When resolution required for a moving image is lower than resolution for image pickup in the mix mode, it is possible to perform a process for reducing the resolution at an appropriate time. For example, if the resolution is reduced before the adding process, processing load during transition to the adding process can be reduced.

Figure 4:
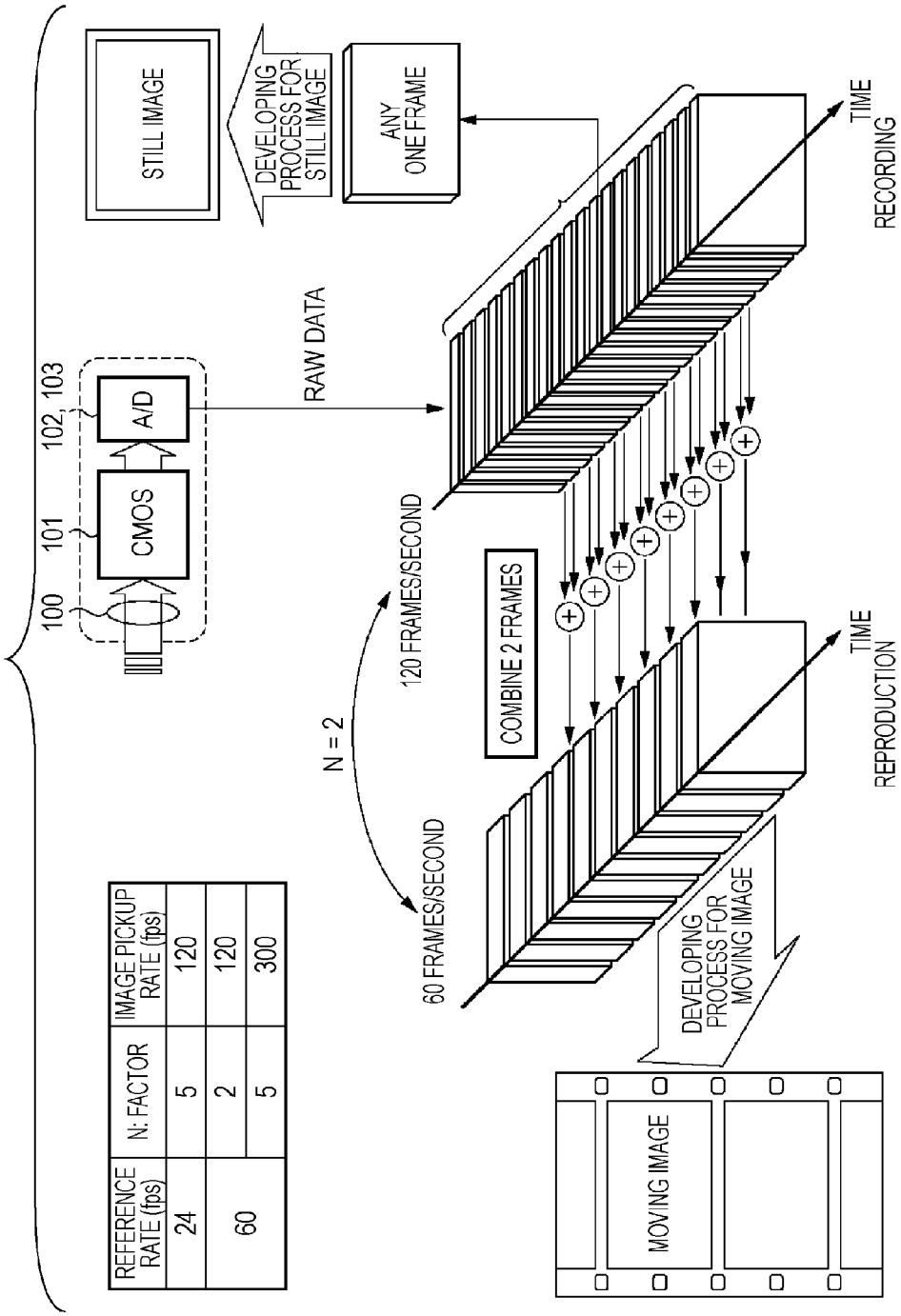
FIG. 4 illustrates an overall operation of the digital video camera according to the first exemplary embodiment of the present invention.

With reference to FIG. 4, an overall operation of the digital video camera of the present exemplary embodiment will be further described.

A subject image is formed by the image-pickup optical system 100 onto the image sensor 101, such as a CMOS image sensor, processed by the A/D converter 102 and the pixel correction unit 103, and output as digital data called RAW data.

There will be described the case where, when the mix mode is selected and the moving-image-reproduction frame rate serving as a reference rate is 24 fps for movies or 60 fps, the image-pickup frame rate is double (N=2) or five times (N=5) the reference rate.

When the RAW data is image data picked up at a frame rate of 120 fps, if two adjacent frames are added together and level-adjusted, the RAW data can be reproduced as a moving image with a frame rate of 60 fps. Alternatively, if five adjacent frames are added together and level-adjusted, the RAW data can be reproduced as a moving image with a frame rate of 24 fps.

When the RAW data is image data picked up at a frame rate of 300 fps, if five adjacent frames are added together and level-adjusted, the RAW data can be reproduced as a moving image with a frame rate of 60 fps. Alternatively, if six adjacent frames are added together and level-adjusted, the RAW data can be reproduced as a moving image with a frame rate of 50 fps, and it is possible to generate information substantially compliant with the phase alternating line (PAL) standard.

As for still image reproduction, any one frame is extracted from the RAW data and processed by the color decoding unit 215, the AWB unit 216, and the nonlinear processing unit 217. Thus, according to the above-described example of the moving image, a still image picked up at a shutter speed of $\frac{1}{120}$ second or $\frac{1}{300}$ second can be obtained.

As described above, in the present exemplary embodiment, only by setting image-pickup parameters which reflect the intent of the user to produce a still image, parameters for moving-image pickup can be automatically set, and thus, operability can be improved. At the same time, there is no need to pre-select a moving image mode or a still image mode.

Additionally, since practically different periods of exposure time can be set for moving and still images, still-image pickup can be performed at exposure time suitable for picking up still images, without being affected by the frame rate for moving image reproduction. Therefore, even when an image of a moving subject is picked up, the resulting image is less prone to blurring.

Moreover, since no mode switching takes place, still-image pickup does not cause a moving image to be lacked. Additionally, since image pickup is performed at high resolution, there is no need to create a still image from a moving image with low resolution, and thus a high-resolution still image can be obtained.

Second Exemplary Embodiment

Figure 2:
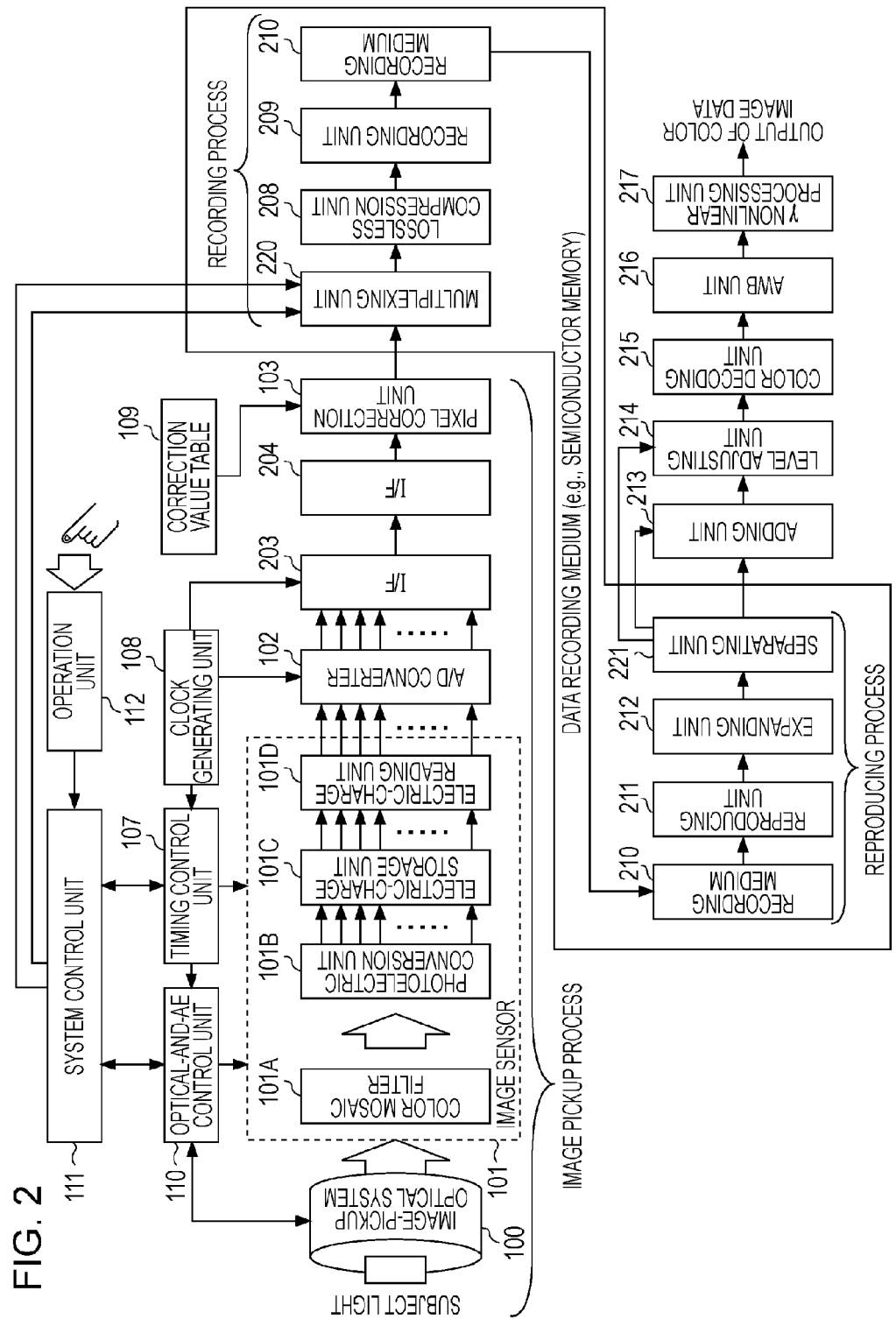
FIG. 2 illustrates a configuration of a digital video camera serving as an example of an image pickup apparatus according to a second exemplary embodiment of the present invention.

Next, with reference FIG. 2, a second exemplary embodiment of the present invention will be described. A digital video camera serving as an example of an image pickup apparatus of the present exemplary embodiment has a configuration identical to that of the digital video camera of the first exemplary embodiment except that an additional configuration for recording and reproducing processes is provided at the position of point A in FIG. 1. Therefore, functional blocks identical to those of the first exemplary embodiment are given the same reference numerals and their description will be omitted.

With the additional configuration for implementing recording and reproducing processes, the digital video camera of the present exemplary embodiment can record a picked-up image in the form of RAW data, perform a frame adding process or the like on the RAW data for reproduction, and thus can perform reproduction at any frame rate. Additionally, it is possible to select any frame as a still image.

The operation of the digital video camera of the present exemplary embodiment will now be described. The following primarily discusses differences from the configuration illustrated in FIG. 1.

An interface (I/F) 203 is a parallel-to-serial interface. The I/F 203 converts a parallel signal output by the A/D converter 102 into a serial signal and outputs the resulting serial signal. An I/F 204 receives the output from the I/F 203 and supplies the received output to the pixel correction unit 103. Although the I/F 203 is located near the image sensor 101, the I/F 204 may be located away from the image sensor 101.

The pixel correction unit 103 applies a correction process to received image data on the basis of values in the correction value table 109. The pixel correction unit 103 may be located upstream of the I/F 203. Arranging the pixel correction unit 103 upstream of the I/F 203 is advantageous in that sensor-related circuits can be mounted in a concentrated manner.

The system control unit 111 controls the optical-and-AE control unit 110 according to parameter values of various image pickup modes set by the user through the operation unit 112. Then, the optical-and-AE control unit 110 controls the image-pickup optical system 100. Upon receipt of a clock pulse from the clock generating unit 108, the system control unit 111 and the optical-and-AE control unit 110 operate on the basis of a timing pulse generated by the timing control unit 107. For convenience of explanation, the sequence of steps described so far is referred to as "image pickup process".

A multiplexing unit 220 multiplexes the image-pickup parameter values (exposure time, frame rate, program line mode for AE control, and the like) from the system control unit 111 into pixel-corrected image data, so-called RAW data. Then, a lossless compression unit 208 performs lossless compression on the output from the multiplexing unit 220 by arithmetic coding or the like.

A recording unit 209 performs so-called channel coding suitable for a recording medium on the output from the lossless compression unit 208. The recording unit 209 also performs error correction coding. Additionally, the recording unit 209 records the resulting data stream on a recording medium 210. The recording medium 210 may be of any type, such as a hard disk (HDD), an optical disk, or a semiconductor memory, and does not necessarily have to be removable. For convenience of explanation, the sequence of steps performed by the multiplexing unit 220, the lossless compression unit 208, and the recording unit 209 is referred to as "recording process".

As described above, since RAW data is recorded in the recording medium 210, any frame can be extracted as a still image to be reproduced.

The recording process starts or ends in response to an instruction given by the user through the operation unit 112. The start and stop instructions for the recording process may be common to those for the reproducing process. In response to these instructions, the system control unit 111 controls the execution and termination of the recording process and reproducing process.

A reproducing unit 211 reproduces the data stream recorded in the recording medium 210 as described above. An expanding unit 212 decompresses the lossless-compressed data stream to restore the original data. A separating unit 221 separates the restored data stream into image data and image-pickup parameter values (exposure time, frame rate, program line mode for AE control, and the like).

Then, the resulting data is supplied to the adding unit 213 and the level adjusting unit 214 for setting arithmetic coefficients. For convenience of explanation, the sequence of steps following the recording process is referred to as "reproducing process".

The configuration and operation of the adding unit 213 and other components located downstream of the adding unit 213 are basically the same as those described in the first exemplary embodiment, and thus, their detailed description will be omitted. However, unlike the first exemplary embodiment where the system control unit 111 controls the adding process and the level adjusting process, the adding unit 213 and level adjusting unit 214 of the second exemplary embodiment control these processes on the basis of image-pickup parameter values received from the separating unit 221.

That is, on the basis of a moving-image frame rate included in the image-pickup parameter values and a predetermined reference rate for reproduction, the adding unit 213 determines the number of frames to be added together and performs the adding process. Then, the adding unit 213 notifies the level adjusting unit 214 of the number of frames added together. The level adjusting unit 214 divides the result of the addition by the received number of frames added together.

The process performed thereafter is identical to that of the first exemplary embodiment and thus is not described here.

In addition to the effects achieved in the first exemplary embodiment, the following effects can be achieved in the present exemplary embodiment. That is, since a configuration for implementing a recording process is provided, moving and still images can be recorded without making a distinction therebetween during image pickup.

Additionally, since a configuration for implementing a reproducing process is provided, any frame can be extracted as a still image during reproduction. Therefore, unlike the configuration in which only a still image captured when a shutter button is pressed can be obtained, a still image picked up at a desired time can be obtained after the image pickup operation.

Moreover, by performing the frame adding process and level adjusting process during reproduction, the moving-image frame rate can be changed during reproduction.

Additionally, since images are recorded in the form of RAW data, it is possible to realize a system in which an adding process performed during reproduction does not cause degradation in image quality. In particular, by adoption of the lossless compression technique to the compression process performed during recording, a reproducing process can be performed without loss of information.

Third Exemplary Embodiment

Next, a third exemplary embodiment of the present invention will be described.

(Recording Process)

Figure 5:
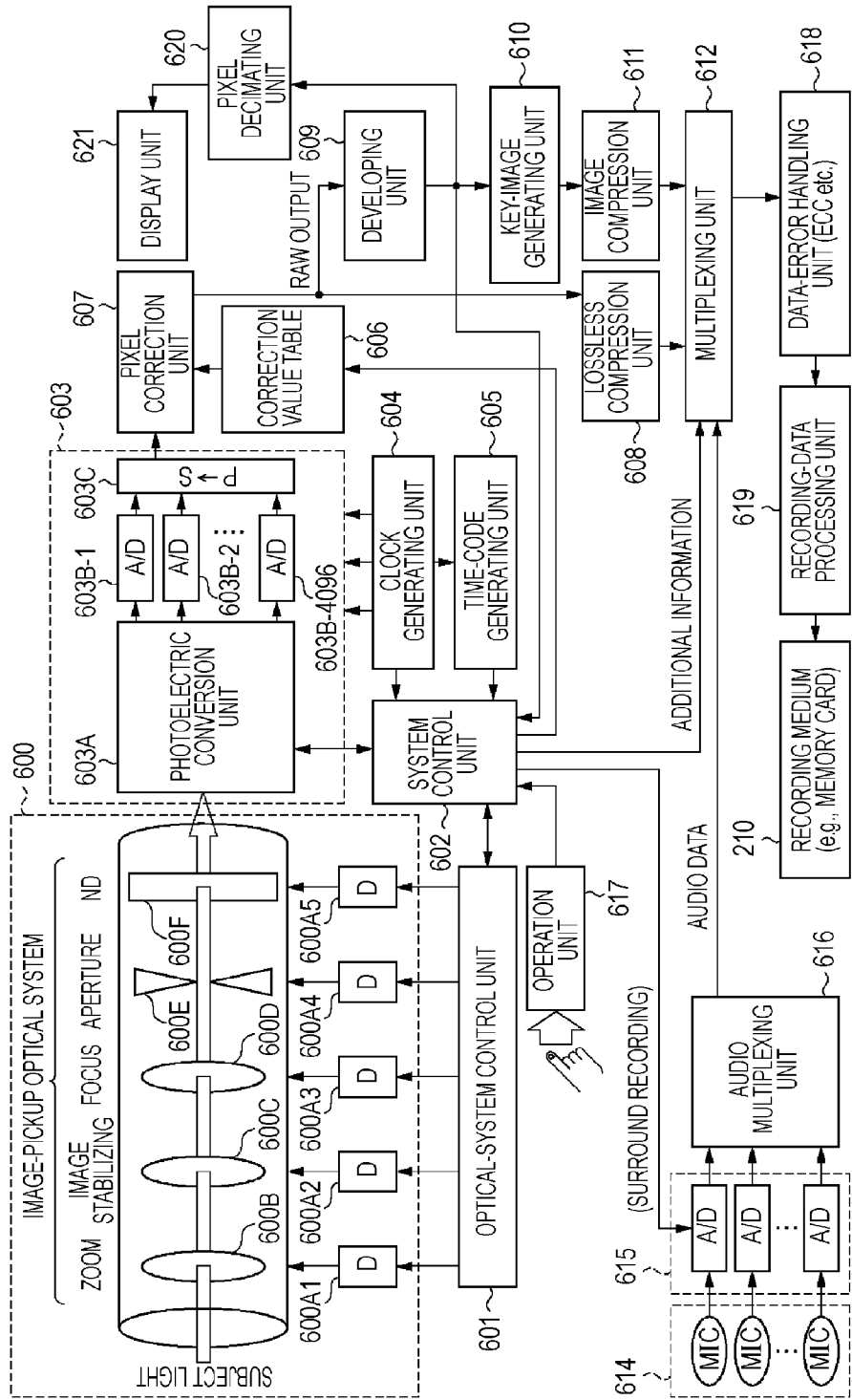
FIG. 5 primarily illustrates a configuration for a recording process in a digital video camera serving as an example of an image pickup apparatus according to a third exemplary embodiment of the present invention.

FIG. 5 primarily illustrates a configuration for a recording process in a digital video camera serving as an example of an image pickup apparatus according to the third exemplary embodiment of the present invention. Each functional block as well as the operation of the recording process will now be described.

An image-pickup optical system 600 forms a subject image onto an image sensor 603. A voltage corresponding to the intensity of light of each region in the subject image, the region corresponding to each pixel of the image sensor 603, is output from a photoelectric conversion unit 603A on a pixel-by-pixel basis. Then, a conversion process is performed in parallel by A/D converters 603B-1 to 603B-4096 (commonly called column A/D) provided for respective pixel columns in a vertical direction, and digital image signals are output at a high speed.

In this example, 4096 A/D converters are provided on the assumption that screen information corresponding to a pixel configuration commonly called 4K digital cinema is read. More specifically, besides the A/D converters for effective pixels, A/D converters for light-shielding pixels called optical black (OB) pixels (not shown) are also provided. Then, values obtained by the A/D converters for the OB pixels are used to determine the black level.

Like the image sensor 101 of the first and second exemplary embodiments, the image sensor 603 in the digital video camera of the present exemplary embodiment includes a color mosaic filter (not shown). A clock generating unit 604 supplies appropriate clock signals to the image sensor 603, a system control unit 602, and a time-code generating unit 605.

Analog voltages corresponding to respective pixel columns are simultaneously read in parallel from the photoelectric conversion unit 603A, and converted to digital data and read by the A/D converters 603B-1 to 603B-4096 provided for the respective columns. Then, the resulting data is converted by a parallel-to-serial (P/S) converter 603C to a serial data stream (pixel data stream) and output from the image sensor 603.

A pixel correction unit 607 performs a pixel correction process on the pixel data stream output from the image sensor 603, on the basis of correction data that is read from a correction value table 606 and is unique to the photoelectric conversion unit 603A. Then, the pixel correction unit 607 outputs the resulting data as RAW data, which is supplied to a lossless compression unit 608 and a developing unit 609.

The lossless compression unit 608 applies a lossless compression process, such as arithmetic coding, to the RAW data. The developing unit 609 performs, in consideration of the color arrangement of the color mosaic filter in the image sensor 603, color interpolation for interpolating color components lacking in the data for each pixel. The image data developed by the developing unit 609 is supplied to a pixel decimating unit 620, the system control unit 602, and a key-image generating unit 610.

To match the frame rate of the developed image data to the display frame rate of a display unit 621, the pixel decimating unit 620 performs a process, such as frame decimation, for reducing the number of frames. Then, the pixel decimating unit 620 performs a process for matching the resolution (or the number of pixels) of the image data to the number of pixels to be displayed on the display unit 621. Typically, since the resolution of the image data is higher than the number of pixels to be displayed on the display unit 621, the pixel decimating unit 620 performs, for example, decimation of pixels to reduce the resolution of the image data. The resulting image data is displayed on the display unit 621, such as an LCD.

The system control unit 602 analyzes the image data from the developing unit 609 to obtain image information, such as brightness information, necessary for controlling the image-pickup optical system 600. Then, the system control unit 602 supplies the obtained image information to an optical-system control unit 601. On the basis of the image information obtained from the system control unit 602, the optical-system control unit 601 supplies control signals to respective drive-signal generating units 600A1 to 600A5 so as to optimally control respective control parameters of the image-pickup optical system 600. Optical systems 600B to 600F described below operate in response to respective drive signals from the drive-signal generating units 600A1 to 600A5.

The image-pickup optical system 600 include the optical system 600B for zoom adjustment, the shift optical system 600C for correcting motion blur caused by hand shake, and the optical system 600D for focus adjustment. The image-pickup optical system 600 further includes, as optical systems for adjusting an incident light quantity, the aperture mechanism 600E capable of adjusting an incident light quantity and the ND filter 600F that can be selectively inserted in the optical path.

The key-image generating unit 610 causes an image compression unit 611 to perform a compression process, which is typically a lossy compression process, at a high compression rate on the image data from the developing unit 609, thereby generating a key image for use in retrieval. In the present exemplary embodiment, a Joint Photographic Experts Group (JPEG) compression process is performed on the image data to generate a key image for still-image retrieval, while a Moving Picture Experts Group (MPEG) compression process is performed on the image data to generate a key image (moving image) for moving-image retrieval. For the MPEG compression process, if the image data has been picked up at a frame rate N times the reference frame rate for reproduction, intra-frame compression coding is applied to every N-th frame and inter-frame compression coding is applied to the other frames. Alternatively, after the frame rate is reduced by a factor of N, a lossy compression is performed by a known MPEG (such as MPEG-1/2/4/AVC) encoder, in consideration of compatibility with viewing and listening at existing frame frequencies, such as those of the National Television System Committee (NTSC) standard or high-definition television (HDTV) standard. MPEG-encoded data can be received without imposing heavy load of decoding.

A multiplexing unit 612 multiplexes the following items:
1) RAW data lossless-compressed by the lossless compression unit 608;
2) key still and moving images generated by the image compression unit 611 for use in retrieval;
3) additional data (various operation parameters of the image-pickup optical system 600, and information relating to the image pickup operation of the image sensor 603) received from the system control unit 602; and
4) audio information.

Examples of the above-listed various operation parameters of the image-pickup optical system 600 include an incident light quantity, an aperture value, a focal length, focus information, zoom, the presence of the ND filter 600F, a state of vibration, and a state of image stabilization. Examples of the above-listed information relating to the image pickup operation of the image sensor 603 include a driving frame rate of the image sensor 603, a stored time value (electronic shutter speed), a read pixel rate, a state of pixel addition and a configuration of read pixels.

The audio information listed above is from the direction of the subject and is detected by a group of microphones 614, digitized by a group of A/D converters 615, multiplexed by an audio multiplexing unit 616, and supplied as audio information data to the multiplexing unit 612. In the present exemplary embodiment, the audio information is, for example, multichannel audio information data adaptable to surround sound.

A data-error handling unit 618, for example, adds an error correction code (ECC) to the multiplexed data output from the multiplexing unit 612 for correction of data errors. Then, a recording-data processing unit 619 performs data processing (so-called channel coding) for recording to the recording medium 210. The recording-data processing unit 619 records the resulting data on the recording medium 210, such as a semiconductor memory.

(Reproducing Process)

Figure 6:
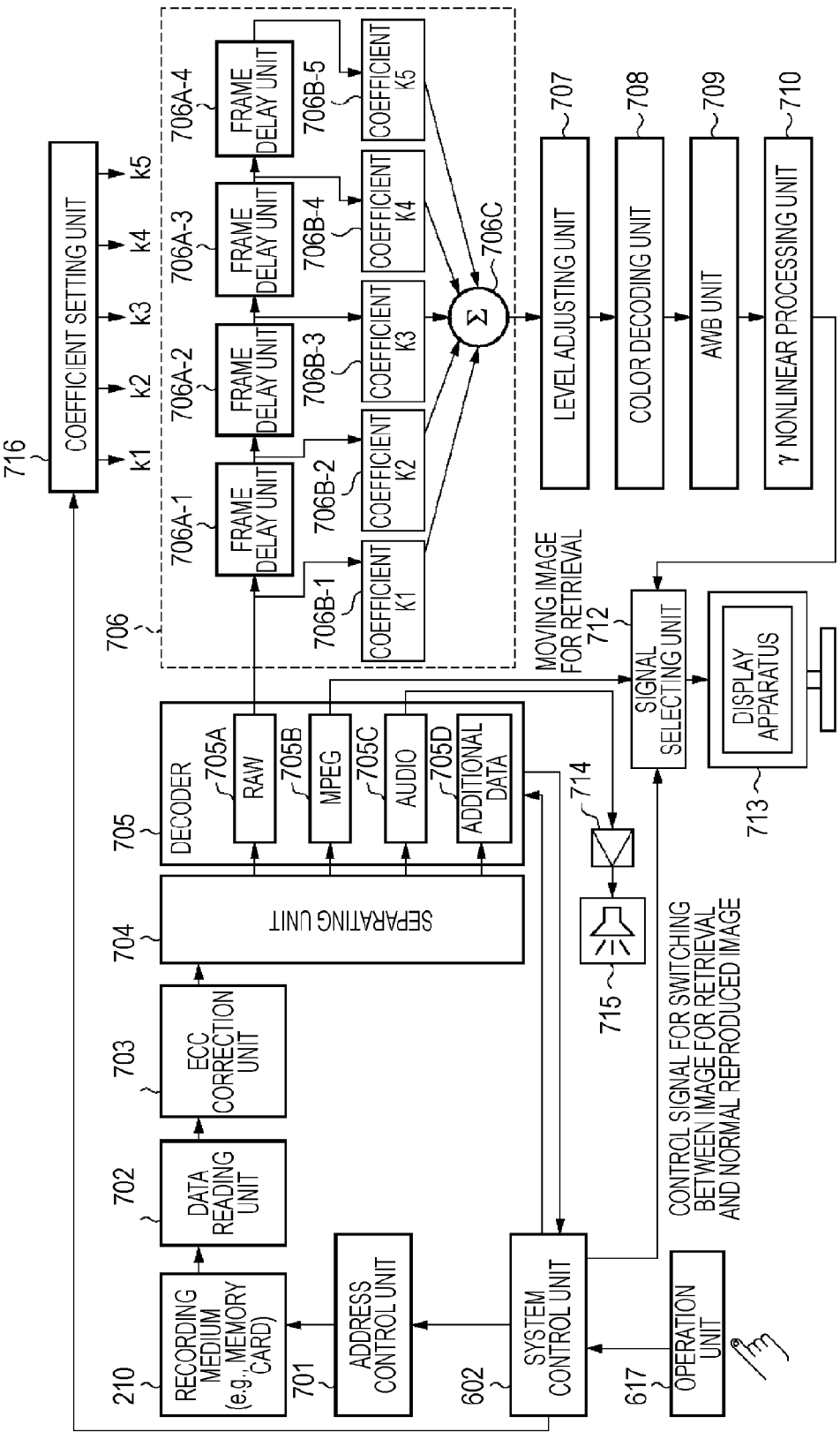
FIG. 6 primarily illustrates a configuration for a reproducing process in the digital video camera serving as an example of the image pickup apparatus according to the third exemplary embodiment of the present invention.

FIG. 6 primarily illustrates a configuration for a reproducing process in the digital video camera serving as an example of the image pickup apparatus according to the third exemplary embodiment of the present invention. Each functional block as well as the operation of the reproducing process will now be described.

The data recorded on the recording medium 210 is read by a data reading unit 702 and error-corrected by an ECC correction unit 703. A separating unit 704 separates the four types of data multiplexed during recording. Each of the resulting data items is decoded by a decoding unit (decoder) 705. Specifically, RAW data is decoded by a decoder 705A, key still/moving images for use in retrieval are decoded by an MPEG/JPEG decoder 705B, audio data is decoded by an audio decoder 705C, and additional data including various parameters is decoded by an additional-data decoder 705D.

(Processing of Raw Data)

The decoded RAW data is supplied to an adding unit 706. In the adding unit 706, frame delay units 706A-1 to 706A-4, each being a buffer for one frame, are connected in series. Then, five frames of RAW data, that is, one frame of non-delayed RAW data and four frames of RAW data delayed by one to four frames are weighted by respective coefficient multipliers 706B-1 to 706B-5 with their corresponding weighting coefficients K1 to K5 and added together by an adder (Σ) 706C. The weighting coefficients K1 to K5 are assigned to the coefficient multipliers 706B-1 to 706B-5, respectively, by a coefficient setting unit 716 according to an instruction from the system control unit 602. For example, if the number of frames to be added together is four, the weighting coefficient K5 can be set to zero. Alternatively, the weighting may vary depending on the frame.

Each pixel of the added RAW data produced by the adder 706C has the sum of values obtained by weighting the values of corresponding pixels in a plurality of consecutive frames. Therefore, when a level adjusting unit 707 divides the value of each pixel by the number of frames added together, an image of an appropriate level (averaged image) can be obtained.

After the level adjustment, a color decoding unit 708 performs color interpolation and the like, an AWB unit 708 adjusts color balance, a γ nonlinear processing unit 710 performs nonlinear image processing to improve reproducibility in the direction of gradation, and thus final image data can be generated. The generated image data is supplied from the γ nonlinear processing unit 710 to a signal selecting unit 712.

(Processing of Key Image for Retrieval)

The key moving/still image data decoded by the MPEG/JPEG decoder 705B in the decoding unit 705 is supplied as MPEG/JPEG data to the signal selecting unit 712.

As described above, the image data generated from RAW data is also supplied to the signal selecting unit 712. According to an instruction input through an operation unit 617 by the user, the system control unit 602 supplies a control signal to the signal selecting unit 712 to cause the output from the signal selecting unit 712 to switch between the key moving/still image data for retrieval and the image data generated from RAW data.

For example, the signal selecting unit 712 normally outputs a key image for retrieval, and a display apparatus 713 having a decoding function sequentially reproduces key images (JPEG images) for still-image retrieval. When the user wishes to reproduce a moving image relating to a displayed still image, the user inputs an instruction for moving-image reproduction through the operation unit 617. In response to this instruction, the system control unit 602 retrieves moving image data corresponding to additional data containing an image pickup time closest to an image pickup time of the key still image corresponding to the user's instruction and initiates reproduction (i.e., generation of image data from RAW data). At the same time, the system control unit 602 supplies a control signal to the signal selecting unit 712 so as to cause the output data from the signal selecting unit 712 to switch from the key image data to the image data generated from the RAW data.

Alternatively, for example, the system control unit 602 may perform fast-forward reproduction of a key moving image (such as an MPEG image) for retrieval, retrieve moving image data having additional data containing an image pickup time closest to an image pickup time of a key moving-image frame corresponding to a time at which an instruction for moving-image reproduction has been input through the operation unit 617, and initiate reproduction. At the start of the reproduction, the system control unit 602 causes the output data from the signal selecting unit 712 to switch.

When there is image data to be displayed in response to an user's instruction, an address control unit 701 controls the determination as to from which address in the recording medium 210 the image data is to be read.

(Processing of Audio Information)

The audio information separated by the separating unit 704 is decoded by the audio decoder 705C, amplified by an amplifier circuit 714, and reproduced from one or more speakers 715. Additional processing, such as down-mix processing, may be performed depending on the configuration of the amplifier circuit 714, the number of the speakers 715, and the like.

(Processing of Additional Information)

The additional data separated by the separating unit 704 is decoded by the additional-data decoder 705D and supplied to the system control unit 602.

(Detailed Description of Operation)

Hereinafter, the operation of the digital video camera of the present exemplary embodiment will be described in more detail. In the present exemplary embodiment, as described with reference to the flowchart of FIG. 3 in the first exemplary embodiment, an image pickup operation in the mix mode for picking up both moving and still images is performed at a frame rate determined according to the shutter speed (exposure time) set for still-image pickup.

As described above, if the reciprocal of the exposure time set for still-image pickup exceeds an upper limit of the settable range of frame rates, the upper limit is set as the frame rate (step S14). This process will be described in more detail with reference to FIG. 7 and FIG. 8.

For example, when a reference frame rate for reproduction of moving images is 60 fps, the exposure time for still-image pickup is set to $1/300$ second. Exposure control methods applied to this case will be described. The following compares an exposure control method of the related art and that of the present exemplary embodiment.

Figure 7:
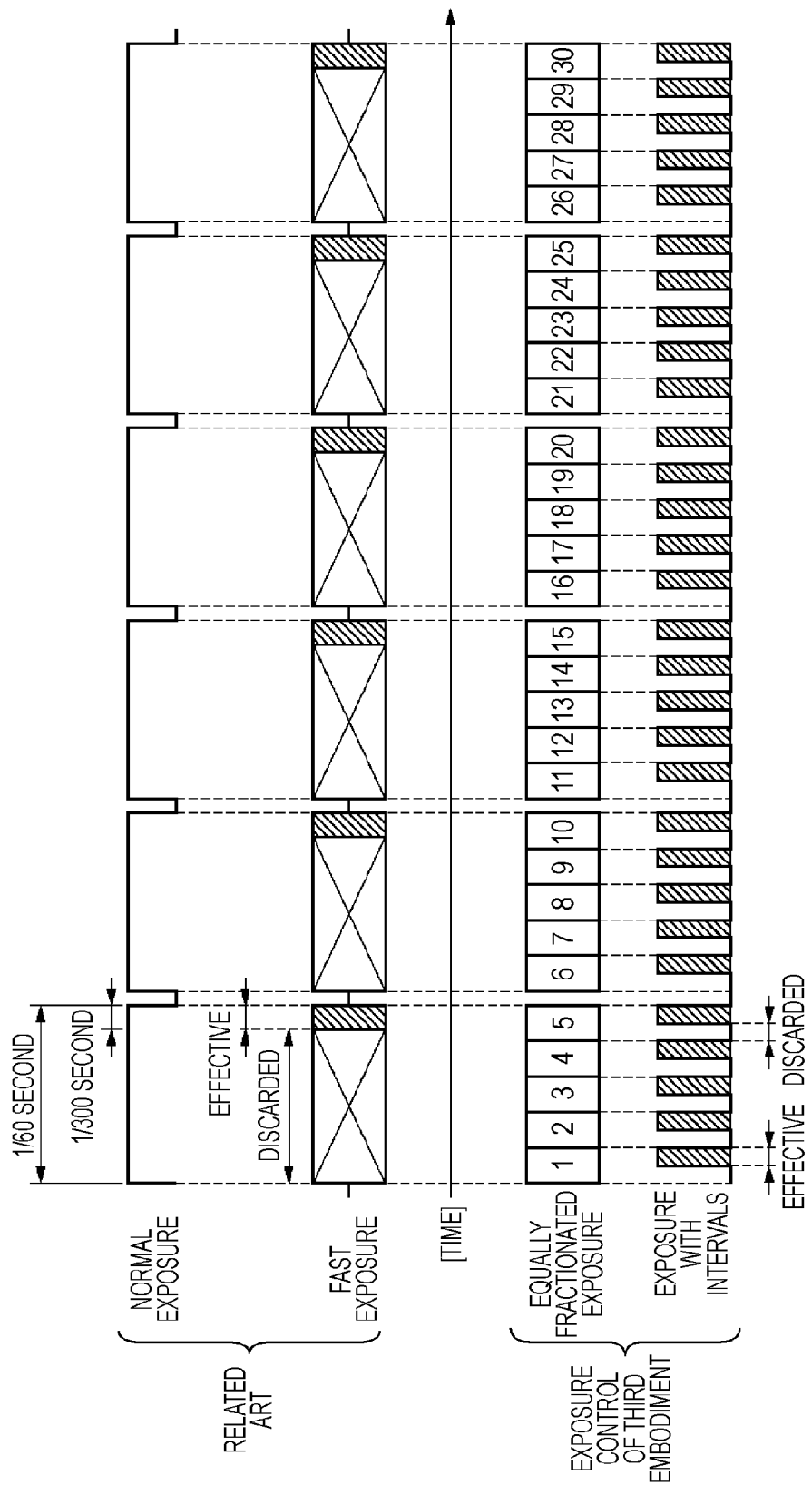
FIG. 7 is a timing diagram illustrating, along a common time axis, a known exposure control method and an exposure control method in the digital video camera according to the third exemplary embodiment of the present invention.

FIG. 7 is a timing diagram illustrating, along a common time axis, an exposure control method of the related art (upper part) and an exposure control method of the present exemplary embodiment (lower part).

The top row shows a timing pulse corresponding to a frame rate of 60 fps. The next row schematically shows an operation performed to realize an exposure time of $1/300$ second with an electronic shutter when image pickup is performed at a frame rate of 60 fps. In the method of the related art, electric charge generated in the first four-fifth ($4/300$ second) of an image pickup period ($1/60$ second) for one frame is discarded, while electric charge generated in the remaining one-fifth ($1/300$ second) of the image pickup period is read as effective electric charge, thereby realizing an exposure of $1/300$ second. Thus, in the method of the related art, since image pickup is performed at $1/60$ fps for moving-image recording, only one still image can be picked up in a period of $1/60$ second.

On the other hand, in the present exemplary embodiment, a frame rate is determined according to exposure time set for still-image pickup. That is, when the exposure time is $1/300$ second, the image pickup is performed at a frame rate of 300 fps. Thus, as shown in the upper row of the lower part of FIG. 7, five still images can be obtained in $1/60$ second by equally fractionated exposures of $1/300$ second each.

When an upper limit of the settable range of frame rates of the image sensor 603 is 300 fps, if exposure time shorter than $1/300$ second is set, the reading speed of the image sensor 603 is not fast enough to keep up with the frame rate.

For example, if the exposure time is set to $1/600$ second, the reciprocal 600 fps exceeds the upper limit of the settable range of frame rates. In such a case, image pickup is performed at a frame rate equal to the upper limit, and an electronic-shutter control method of the related art is applied.

That is, as shown in the bottom row of FIG. 7, electric charge generated in one-half (which is the first half in this case) of the period of $1/300$ second is discarded, while electric charge generated the second half of the period is read as effective electric charge. Thus, still images picked up at a shutter speed of $1/600$ second can be obtained at 300 fps.

As described above, if the reciprocal of exposure time is below the lower limit of the settable range of frame rates, the lower limit is set as the frame rate.

Figure 8:
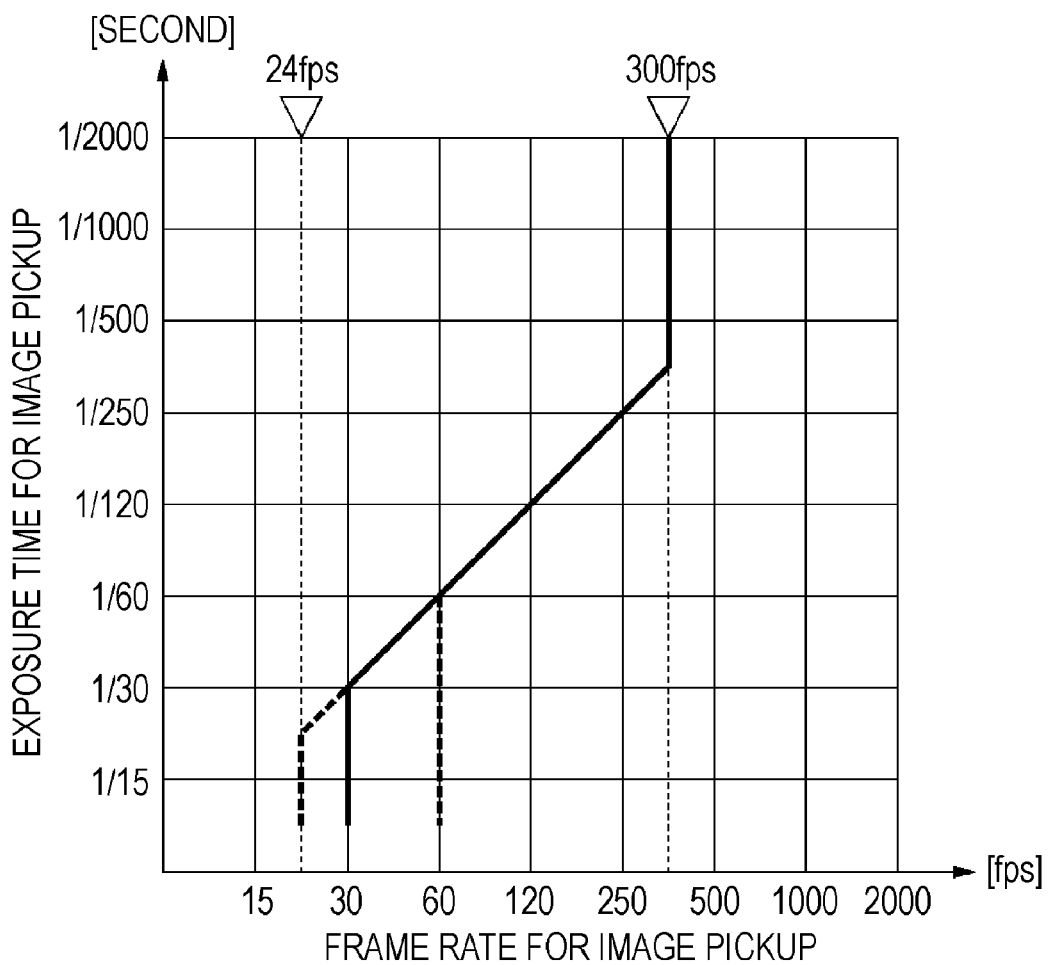
FIG. 8 is a graph showing a relationship between exposure time and a frame rate in the digital video camera according to the third exemplary embodiment of the present invention.

FIG. 8 shows a relationship between the exposure time and the frame rate described above. FIG. 8 shows an example in which a settable range of frame rates is from 30 fps to 300 fps. The vertical axis represents set exposure time (in seconds), and the horizontal axis represents an image-pickup frame rate (in fps) determined according to the exposure time. When the reciprocal of exposure time is within the settable range of frame rates, the reciprocal of exposure time is set as the frame rate.

Since the lower limit of frame rates corresponds to a normal reproduction speed, it will be practical to set the lower limit to 30 fps in a frame mode, 60 fps in a field mode, 50 fps in a PAL mode, and 24 fps in a cinema mode.

Depending on the configuration of the image sensor 603, the above-described operation for discarding unnecessary electric charge cannot be performed. In this case, a reading operation is performed for discarding. This requires additional processing time, leads to increased time loss, and lowers the upper limit of frame rates. Therefore, if an image sensor which is not capable of performing the above-described discarding operation is used, it is preferable to set an upper limit of settable exposure time for still-image pickup, for example, to be the reciprocal of a settable frame rate.

Figure 9:
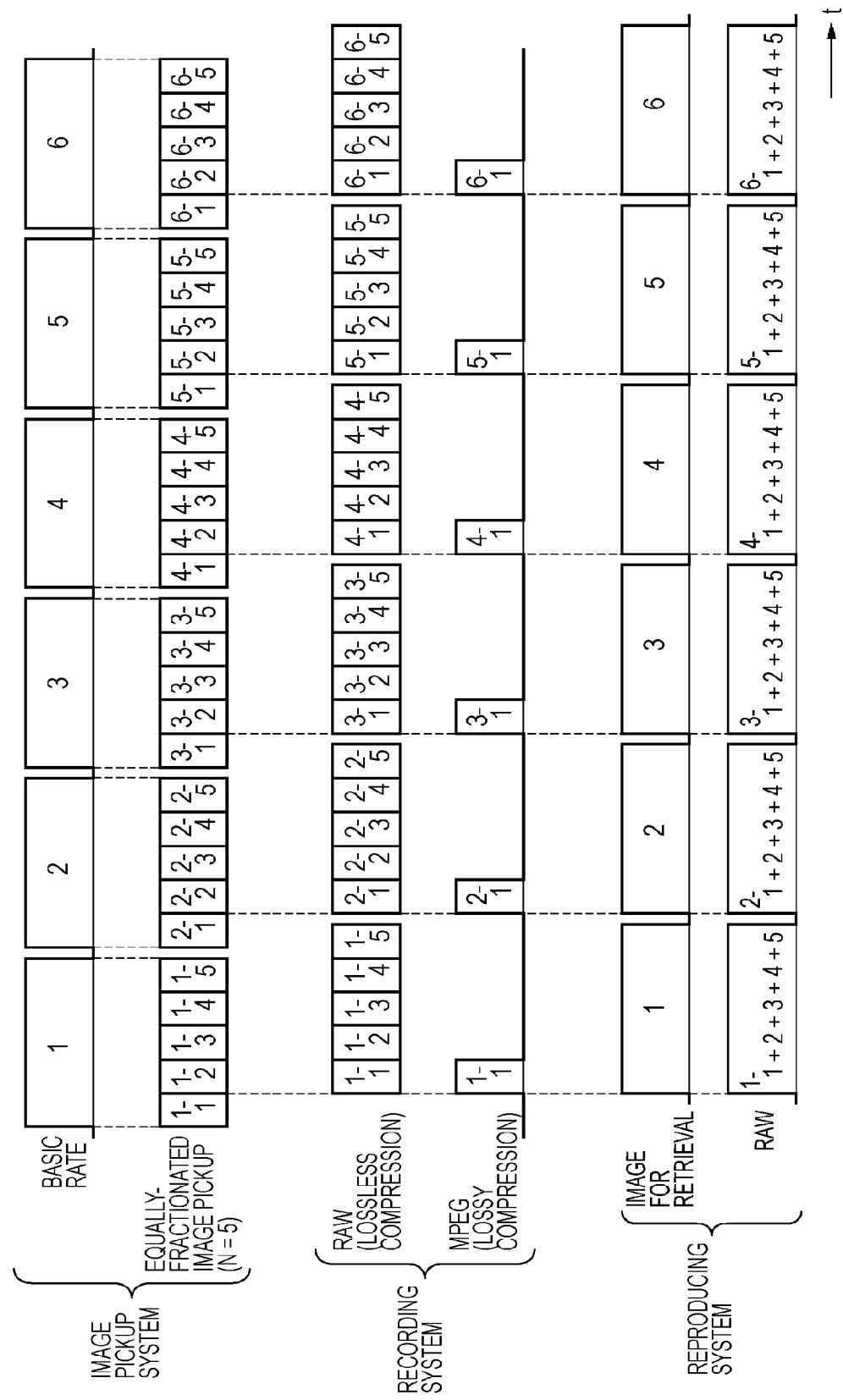
FIG. 9 illustrates temporal relationships among frames during image pickup, recording, and reproduction in the digital video camera according to the third exemplary embodiment of the present invention.

Next, referring to FIG. 9, there will be described temporal relationships among frames during image pickup, recording, and reproduction in the digital video camera of the present exemplary embodiment. In FIG. 9, the horizontal axis is a time axis. The following describes each row in FIG. 9 in order from the top row.

(1) The top row is a timing diagram illustrating a basic frame rate in an image pickup period. The first to sixth frames are presented in time sequence.

(2) The second row is a timing diagram illustrating an image-pickup operation performed in an equally fractionated manner at a frame rate five times (N=5) the basic frame rate. The illustrated timing corresponds to the image output timing of the image pickup system in the present exemplary embodiment. As illustrated, the first frame in the basic frame rate corresponds to five frames, 1-1, 1-2, . . . , and 1-5, in the frame rate that is five times (N=5) the basic frame rate. Likewise, the second frame in the basic frame rate corresponds to five frames, 2-1, 2-2, . . . , and 2-5. In this manner, images are generated at a frame rate N times the basic frame rate.

(3) The third row illustrates recording timing of RAW data output from the image pickup system. The recording timing is illustrated on the assumption that data processing (lossless compression) for the recording requires a period of time corresponding to about one frame. The RAW data of all frames is recorded also at a frame rate five times (N=5) the basic frame rate.

(4) The fourth row illustrates frames recorded as a key moving image for use in retrieval. In view of compatibility and a reduction of image processing load during reproduction, it is preferable to reproduce the key moving image at a normal reproduction frame rate. Therefore, moving-image encoding is performed by using only images corresponding to the basic frame rate. In the example of FIG. 9, of five frames picked up in $1/60$ second, only the leading frames (1-1, 2-1, 3-1, and so on) are used to generate the key moving image. The moving-image encoding is performed by lossy compression coding, such as MPEG coding. The key moving image and the RAW data are recorded on the same recording medium such that they can be synchronized with each other. Thus, in the present exemplary embodiment, two types of data, RAW data and key data for retrieval, is recorded.

(5) The fifth row illustrates a state where a key image for retrieval is decoded and a key moving image with a basic frame rate is reproduced. On the basis of visual information (typically accompanied with audio information) of the key moving image, the address control unit 701 determines the reproduction address of the corresponding RAW image.

(6) The sixth row illustrates frames processed when a moving image with a basic frame rate is generated from RAW data. Here, to generate a moving image with a frame rate of 60 fps from RAW data picked up at 300 fps, five frames of RAW data are added together and level-adjusted. In this example, to generate the first frame of a moving image, five frames (1-1, 1-2, 1-3, 1-4, and 1-5) of RAW data are processed. Likewise, to generate the second frame of the moving image, five frames (2-1, 2-2, 2-3, 2-4, and 2-5) of RAW data are processed. The subsequent frames are also processed in this manner and successively output as the moving image with the basic frame rate.

Figure 10:
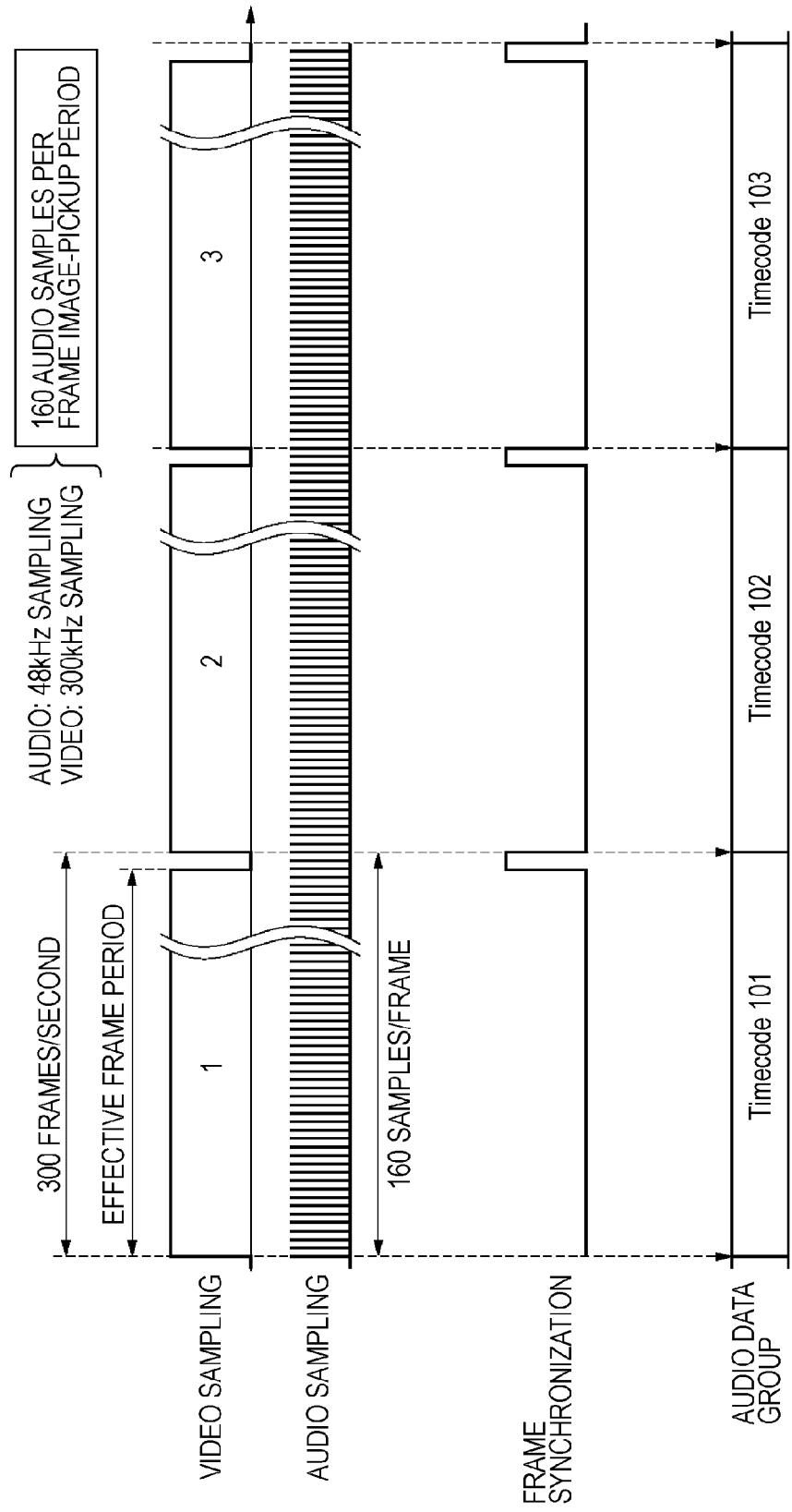
FIG. 10 illustrates synchronization timing between audio and image in the digital video camera according to the third exemplary embodiment of the present invention.

Next, with reference to FIG. 10, synchronization of audio and image will be described. The following describes the case where the reproduction frame rate of a moving image is 30 fps (or 60 fields per second), and the image-pickup frame rate is five times a reference frame rate (N=5, 300 fps).

When video sampling is performed 300 times per second (300 Hz) and audio sampling is performed 48000 times per second (48 kHz), the number of times of audio sampling performed per frame is 160.

Possible examples of recording modes of audio information include a monaural mode (1 channel), a stereo mode (2 channels), and a surround mode (5.1 channels to 22.1 channels). The data structure and the amount of data vary depending on the recording mode selected. Therefore, it is necessary to associate one video sample (one frame) with each of 160 audio sample data items. The present exemplary embodiment is characterized in that sampling timing is used to define the correspondence between video and audio.

It is possible that audio and image may become out of synchronization in an output stage for outputting picked-up image data or in an image processing step for frame rate conversion performed during reproduction. A minimum image unit for the image processing is one frame in image pickup. Therefore, an audio time code is updated at least at one-frame intervals.

Specifically, audio data samples obtained during a time period corresponding to one-frame image-pickup period are brought together to generate a data stream in which a header or the like is assigned a time code identical to that of the corresponding image frame (the details will be described below with reference to FIG. 14).

In a known method, such as the MPEG method, a timestamp method that specifies decoding timing is mainstream. However, in the present invention, where a given number of frames are added together to form a moving image frame during reproduction, it is difficult to define the correspondence between video and audio during reproduction. Accordingly, the correspondence is defined during sampling. Then, by using the correspondence (synchronization) information during reproduction, it is possible to maintain the synchronization between video and audio while realizing reproduction at variable frame rates.

As in the case of RAW data, when lossless compression is performed on audio information, it is possible to reduce constraints imposed on the configuration of the apparatus.

Figure 11:
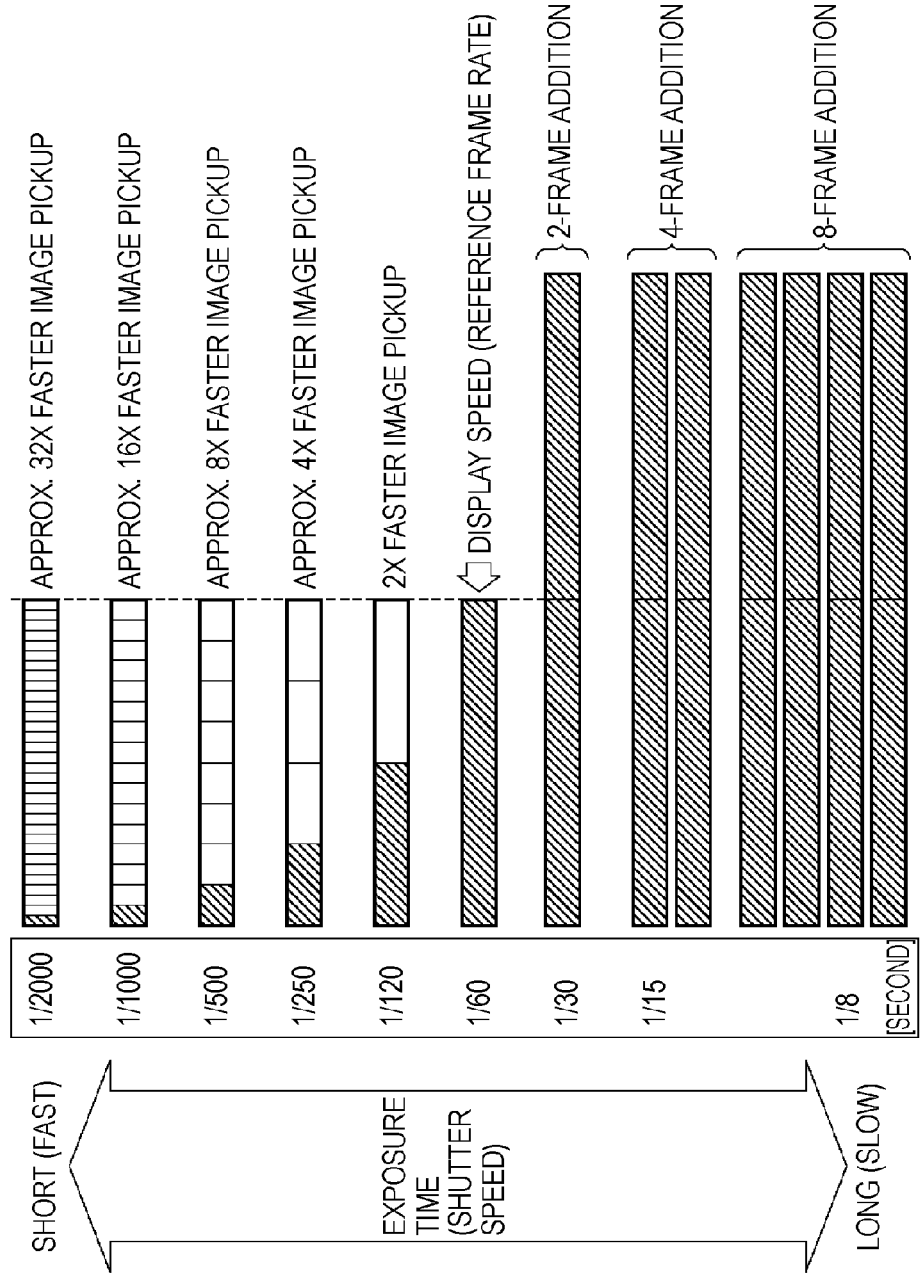
FIG. 11 illustrates relationships of the setting of exposure time, the number of picked-up image frames, and an image addition and synthesis process for reproduction at a reference frame rate in the digital video camera according to the third exemplary embodiment of the present invention.

With reference to FIG. 11, there will be described relationships of the setting of exposure time, the number of picked-up image frames, and an image addition and synthesis process for reproduction at a reference frame rate. FIG. 11 schematically illustrates relationships of exposure time (shutter speed), the number of image frames picked up at a frame rate set according to the exposure time, and the number of frames used during moving-image reproduction.

In the example of FIG. 11, a reference frame rate for moving-image reproduction is set to 60 fps. Therefore, when exposure time is $\frac{1}{60}$ second, all picked-up image frames can be reproduced at 60 fps. This relationship is substantially the same as a typical relationship between an image pickup apparatus and a reproducing apparatus. Strictly speaking, in the NTSC standard, the reference frame rate is often indicated as 59.94 fps (Hz) instead of 60 fps. However, for convenience of explanation, the following description is based on the assumption that the reference frame rate is 60 fps. Likewise, a frame rate of 29.97 fps is expressed as 30 fps in the following description.

Starting from an exposure time of $\frac{1}{60}$ second, the exposure time is sequentially reduced by half, as follows:

$\frac{1}{60}$ second corresponds to 60 fps (1× faster image-pickup);

$\frac{1}{120}$ second corresponds to 120 fps (2× faster image-pickup);

$\frac{1}{250}$ second corresponds to 250 fps (about 4× faster image-pickup);

$\frac{1}{500}$ second corresponds to 500 fps (about 8× faster image-pickup);

$\frac{1}{1000}$ second corresponds to 1000 fps (about 16× faster image-pickup); and $\frac{1}{2000}$ second corresponds to 2000 fps (about 32× faster image-pickup).

(The above-described relationship also applies to faster shutter speeds.)

Although shutter speeds of up to $\frac{1}{2000}$ second can be set (or the shutter can be driven at speeds of up to $\frac{1}{2000}$ second), if the continuous reading performance of the image sensor 603 is, for example, up to 500 fps, image pickup is performed at 500 fps. In this case, an image exposed in $\frac{1}{2000}$ second is read at 500 fps. This means that a time-lapse occurs and the number of frames is reduced by a factor of four, as compared to the case where an image is read at 2000 fps.

When exposure time is set to be longer than a reference time of $\frac{1}{60}$ second, the image-pickup frame rate is maintained at 60 fps for maintaining a moving-image viewer (monitor) function of the camera system. This applies to the cases of $\frac{1}{30}$ second, $\frac{1}{15}$ second, $\frac{1}{8}$ second, and slower shutter speeds (or longer exposure time). On the basis of the relationship described above, the image-pickup frame rate is set according to the shutter speed (exposure time) set for image pickup, and thus, an image pickup operation is performed.

In the frame adding process during reproduction, the number of frames to be added together is basically a factor by which the reference frame rate is to be multiplied.

Then, the resulting images are output at a reference frame rate. Specifically, in the case of $\frac{1}{120}$ second, which is double the reference shutter speed (exposure time), two frames are added together (and level adjusted) and one frame is output every $\frac{1}{60}$ second. Similarly, in the case of $\frac{1}{250}$ second, which is about four times the reference shutter speed, four frames are added together (and level adjusted) and one frame is output every $\frac{1}{60}$ second.

Likewise, in the case of $\frac{1}{500}$ second, which is about eight times the reference shutter speed, eight frames are added together (and level adjusted) and one frame is output every $\frac{1}{60}$ second.

In the case of an upper limit of $\frac{1}{2000}$ second, eight frames picked up in an exposure time of $\frac{1}{2000}$ second at a frame rate of 500 fps are added together (and level adjusted) and one frame is output every $\frac{1}{60}$ second.

As for lower speeds, frames are added together during reproduction such that exposure time specified during image pickup is achieved. In the case of 1/30 second, two images picked up in an exposure time of 1/60 second are added together and output. In this adding process, images to be added together are sequentially shifted by one frame every 1/60 second (corresponding to the reference frame rate) such that identical images are not output successively.

Specifically, in the case of 1/30 second, after the n-th image and (n+1)-th image picked up at an exposure time of 1/60 second are added together and output, the (n+1)-th image and the (n+2)-th image are added together and output. Likewise, when the exposure time for image pickup is set to 1/15 second, after the n-th, (n+1)-th, (n+2)-th, and (n+3)-th frames are added together and output in 1/60 second, input frames are shifted by one frame such that the (n+1)-th, (n+2)-th, (n+3)-th, and (n+4)-th frames are added together and output. In the same manner, when the exposure time for image pickup is set to 1/8 second, eight frames are processed according to the rule of addition described above.

Figure 12:
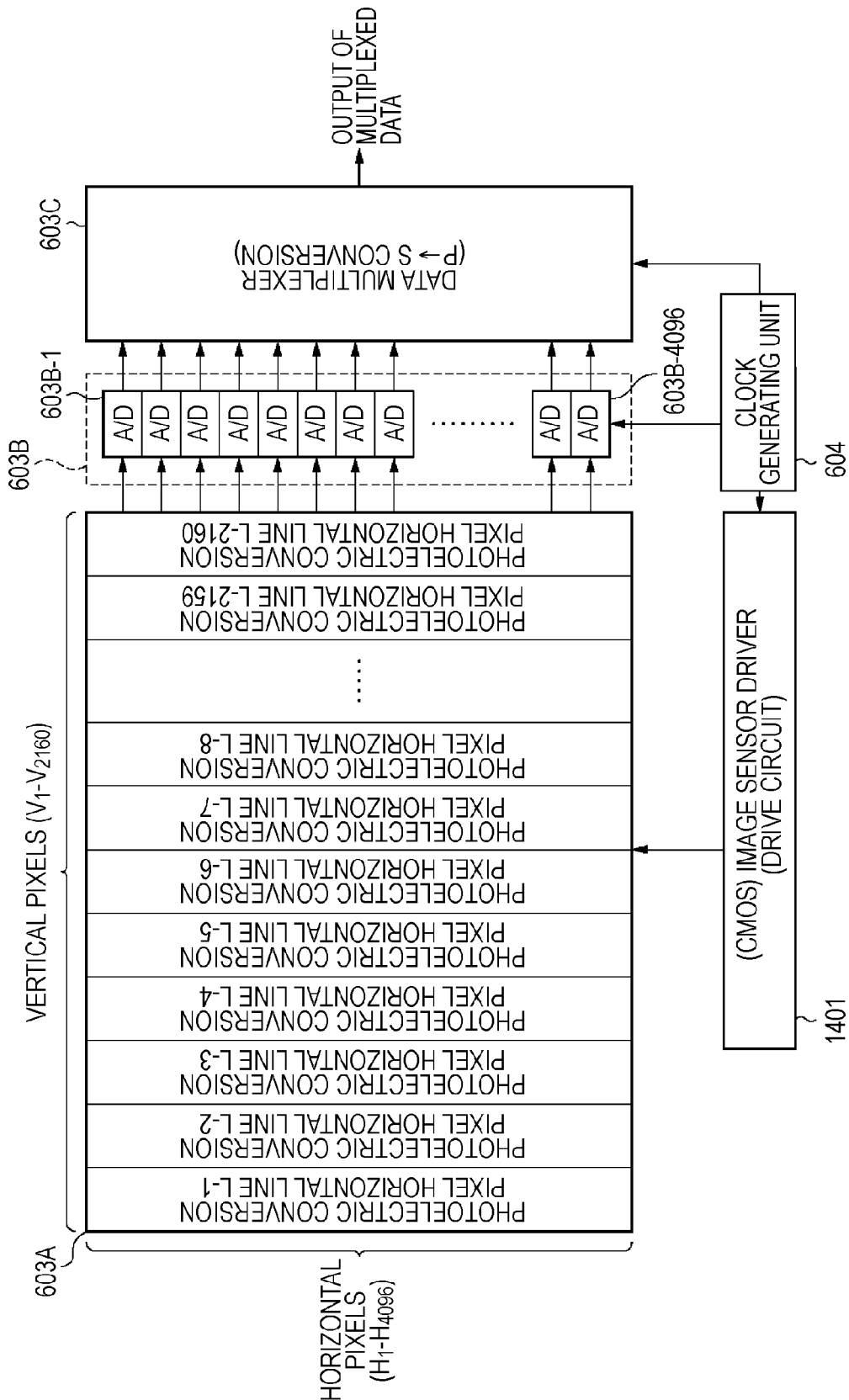
FIG. 12 illustrates a configuration of an image sensor in the digital video camera according to the third exemplary embodiment of the present invention.

Next, with reference to FIG. 12 illustrating a configuration of a CMOS image sensor, an operation of the image sensor 603 will be described in detail.

The photoelectric conversion unit 603A has an effective pixel region including 4096 pixels horizontally and 2160 pixels vertically (603A-1 to 603A-2160), and a small light-shielding region (not shown) called optical black (OB) region around the effective pixel region.

The effective pixel region constitutes an image pickup window, while the OB region is used to set and correct a reference value of a photoelectric conversion level (black level). In response to drive pulses from an image sensor driver 1401, an array of photoelectric conversion pixels included in these regions convert light fluxes from a subject image into electric charge on a pixel-by-pixel basis, stores the electric charge, and output the electric charge as analog values (voltages).

The analog values are sequentially converted to digital values by the group of A/D converters 603B-1 to 603B-4096 called a column A/D (603B) located downstream of the photoelectric conversion unit 603A. The A/D converters 603B-1 to 603B-4096 correspond to respective columns in the photoelectric conversion unit 603A and are provided for the purpose of high-speed reading. Then, a number of data groups corresponding to the number of horizontally aligned pixels (and OB data) are output in parallel. The 4096 data groups (and OB data) are converted by the data multiplexer (P/S converter) 603C downstream of the column A/D 603 into a serial data stream, and output as multiplexed data. Timing signals for performing the above-described operation are output according to timing pulses from the clock generating unit 604.

Figure 13:
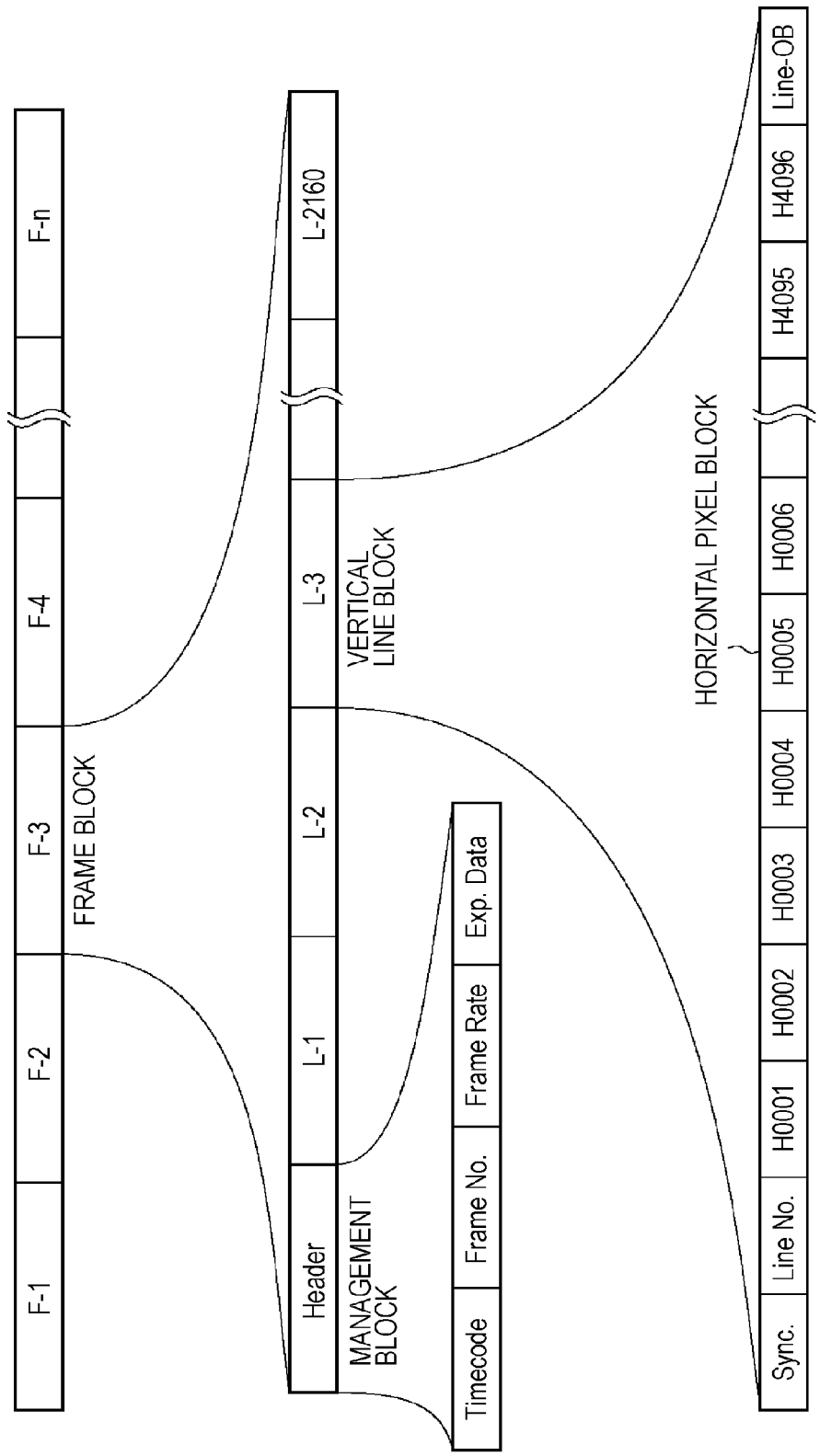
FIG. 13 illustrates a structure of multiplexed data output from the image sensor in the digital video camera according to the third exemplary embodiment of the present invention.

FIG. 13 illustrates a structure of multiplexed data output from the image sensor 603. The top row of FIG. 13 represents, in order from left to right, blocks F-1, F-2, F-3, F-4, . . . , and F-n corresponding to respective frames. Each block contains a frame of data (4096 by 2160 pixels and OB pixels). The second row from the top of FIG. 13 shows details of data in one block, which includes a header block and 2160 line blocks (and OB pixel line) that follow.

The header (Header) serves as a management block and contains information (such as parameters of the image pickup camera) listed below:

Timecode (image pickup year, month, date, minute, and second);

Frame No. (frame number within one second);

Frame Rate (the number of frames picked up per unit time, typically the number of frames per second); and Exp. Data (exposure time).

The header block is followed by line blocks L-1, L-2, L-3, . . . , and L-2160 corresponding to respective lines vertically aligned. Each line block contains synchronization (Sync.) information, line number (Line No.), pixel data values (H001 to H4096), and line OB (Line-OB) value.

As described above, image sensor information is processed by the data multiplexer 603C and output as serial data. In the serial data, pixel data values (H001 to H4096) for each line are packed to form a vertical line block. Then, line blocks are packed to form a frame block and frame blocks are arranged in time sequence to form a data stream shown in the top row of FIG. 13.

Figure 14:
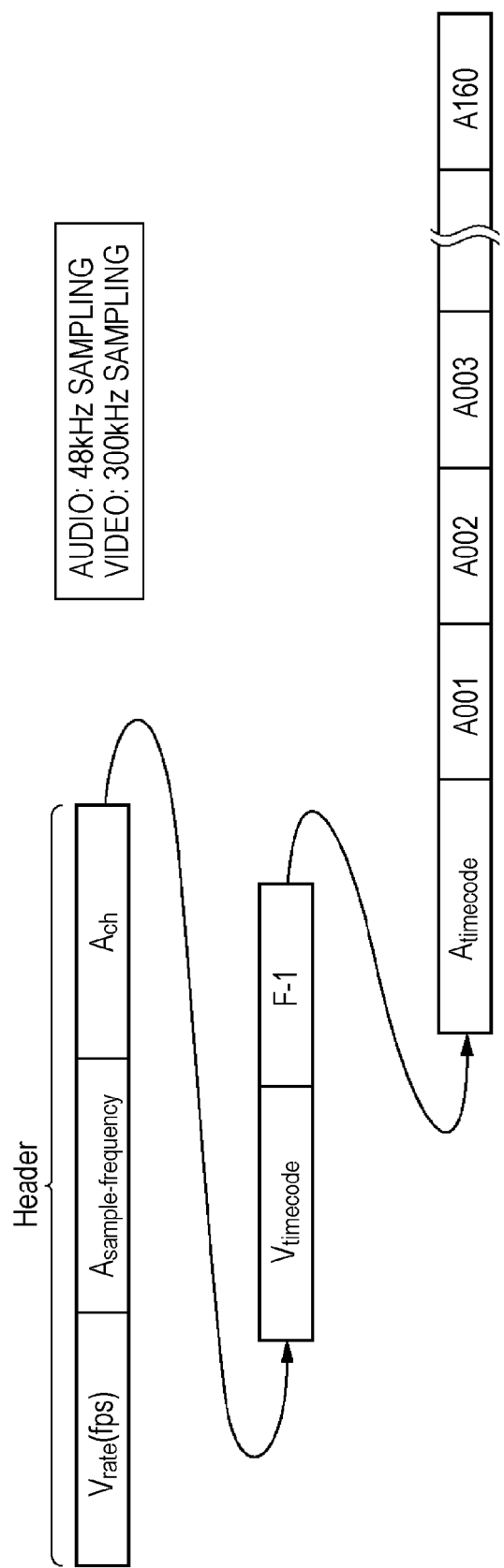
FIG. 14 illustrates a structure of multiplexed data of video and audio time codes in the digital video camera according to the third exemplary embodiment of the present invention.

With reference to FIG. 14, multiplexed data of video and audio time codes will be described. As illustrated in FIG. 14, video data of each frame is given a video time code ($V_{timecode}$). Then, audio data items (160 samples in the above example) sampled in an image pickup period of the corresponding frame are grouped together and assigned an audio time code ($A_{timecode}$). A combination of video and audio data with a set of time codes is assigned header information (Header) at the leading end. The header information contains a video frame rate ($V_{rate}$ (fps)), an audio sampling frequency ($A_{samp\text{-}frequency}$), and the number of audio channels ($A_{ch}$). Part of the information in the example of FIG. 14 overlaps with the above-described information (see FIG. 13) contained in the serial data stream output from the image sensor 603. However, for quick identification of image attributes, it may be effective to store identical information in multiple layers.

In addition to the effects achieved in the first exemplary embodiment, the following effects can be achieved in the present exemplary embodiment. That is, since a configuration for implementing a recording process is provided, moving and still images can be recorded without making a distinction there between during image pickup. Additionally, since a configuration for implementing a reproducing process is provided, any frame can be extracted as a still image during reproduction. Therefore, unlike the configuration in which only a still image captured when a shutter button is pressed can be obtained, a still image picked up at a desired time can be obtained after the image pickup operation.

Additionally, since image data for retrieval of moving and still images is generated, added to RAW data, and recorded (transmitted), processing load of image decoding during reproduction (reception) can be reduced, as compared to the load of developing the RAW data. At the same time, compatibility with known reproducing devices can be improved.

Moreover, when exposure time for image pickup is set, since a shutter speed corresponding to exposure time shorter than the reciprocal of an upper limit of the image-pickup frame rate can be used, high-speed shooting of a subject and shooting with shallow depth of field can be achieved.

Additionally, since image addition and level adjustment are performed during reproduction, a moving-image frame rate can be changed during reproduction.

Moreover, since images are recorded in the form of RAW data, it is possible to realize a system in which an adding process performed during reproduction does not cause degradation in image quality. In particular, by adoption of the lossless compression technique to the compression process performed during recording, a reproducing process can be performed without loss of information.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-146104 filed May 31, 2007, which is hereby incorporated by reference herein in its entirety.

What is claimed is:

1. An image pickup apparatus that outputs picked-up images on a frame-by-frame basis from an image pickup element having a plurality of pixels, the image pickup apparatus comprising:
    a shutter-speed setting unit configured to set a shutter speed for still-image pickup;
    a frame-rate setting unit configured to set an image-pickup frame rate based on the shutter speed set by the shutter-speed setting unit;
    a control unit configured to control an operation of the image pickup element such that the picked-up images are output at the image-pickup frame rate; and
    a moving-image reproducing unit configured to perform moving-image reproduction by using the picked-up images,
    wherein, when the image-pickup frame rate set by the frame-rate setting unit is higher than a moving-image-reproduction frame rate, the moving-image reproducing unit generates a frame for use in the moving-image reproduction from a plurality of frames of the picked-up images and performs reproduction at the moving-image-reproduction frame rate.

2. The image pickup apparatus according to claim 1, wherein the frame-rate setting unit sets the reciprocal of the shutter speed as the image-pickup frame rate.

3. The image pickup apparatus according to claim 2, wherein, when the reciprocal of the shutter speed exceeds an upper limit of a range of frame rates at which the picked-up images can be read from the image pickup element, the frame-rate setting unit sets the upper limit as the image-pickup frame rate.

4. The image pickup apparatus according to claim 1, wherein the shutter-speed setting unit sets the shutter speed according to automatic exposure control or user setting.

5. The image pickup apparatus according to claim 1, further comprising a recording unit configured to record the pick-up images on a recording medium in the form of RAW data.

6. The image pickup apparatus according to claim 5, wherein each of the plurality of pixels is provided with a color filter, and the RAW data is picked-up image data obtained before color interpolation is performed on signals output from the respective pixels.

7. The image pickup apparatus according to claim 1, wherein the moving-image reproducing unit generates a frame for use in the moving-image reproduction by averaging pixel values of a plurality of consecutive frames of the picked-up images and performs reproduction at the moving-image-reproduction frame rate by using a plurality of generated frames.

8. A method for controlling an image pickup apparatus that uses an image pickup element to output picked-up images on a frame-by-frame basis, the method comprising:
    setting a shutter speed for still-image pickup;
    setting an image-pickup frame rate based on the shutter speed;
    controlling an operation of the image pickup element such that the picked-up images are output at the image-pickup frame rate; and
    performing moving-image reproduction by using the picked-up images,
    wherein, in performing moving-image reproduction, when the image-pickup frame rate is higher than a moving-image-reproduction frame rate, a frame for use in the moving-image reproduction is generated from a plurality of frames of the picked-up images and reproduction is performed at the moving-image-reproduction frame rate.

9. The method according to claim 8, wherein a frame for use in the moving-image reproduction is generated by averaging pixel values of a plurality of consecutive frames of the picked-up images, and
    wherein reproduction is performed at the moving-image-reproduction frame rate by using a plurality of generated frames.

* * * * *